(12) United States Patent
Lee

(10) Patent No.: US 12,439,805 B2
(45) Date of Patent: Oct. 7, 2025

(54) DISPLAY APPARATUS INCLUDING CORE PLATE INCLUDING CORE GROOVE AND CORE LEAD PORTION

(71) Applicant: LG Display Co., Ltd., Seoul (KR)

(72) Inventor: Jeonghoon Lee, Chilgok-gun (KR)

(73) Assignee: LG DISPLAY CO., LTD., Seoul (KR)

( * ) Notice: Subject to any disclaimer, the term of this patent is extended or adjusted under 35 U.S.C. 154(b) by 378 days.

(21) Appl. No.: 17/977,338

(22) Filed: Oct. 31, 2022

(65) Prior Publication Data

US 2023/0189549 A1 Jun. 15, 2023

(30) Foreign Application Priority Data

Dec. 10, 2021 (KR) .................. 10-2021-0176307

(51) Int. Cl.
*H10K 50/84* (2023.01)
*B60K 35/22* (2024.01)
*B60K 35/60* (2024.01)

(52) U.S. Cl.
CPC ............. *H10K 50/84* (2023.02); *B60K 35/60* (2024.01); *B60K 35/22* (2024.01)

(58) Field of Classification Search
None
See application file for complete search history.

(56) References Cited

U.S. PATENT DOCUMENTS

| 11,360,518 | B2 | 6/2022 | Shin et al. |
| 2006/0205446 | A1 | 9/2006 | Lee et al. |
| 2017/0090637 | A1* | 3/2017 | Yoon ................ G06F 3/0412 |
| 2017/0176806 | A1* | 6/2017 | Kang ................ G02B 6/009 |
| 2020/0081288 | A1* | 3/2020 | Bustle ............. G02F 1/13452 |

FOREIGN PATENT DOCUMENTS

| CN | 213367857 U | 6/2021 |
| JP | 2014-50044 A | 3/2014 |
| KR | 10-2006-0080274 A | 7/2006 |
| KR | 10-2020-0073085 A | 6/2020 |

* cited by examiner

*Primary Examiner* — Daniel Whalen
(74) *Attorney, Agent, or Firm* — Birch, Stewart, Kolasch & Birch, LLP

(57) ABSTRACT

A display apparatus can include a display panel, a cover glass disposed on a top face of the display panel, a core plate disposed on a bottom face of the display panel and supporting the display panel, and a bonding structure disposed between the cover glass and the core plate. The core plate can include a core groove defined therein, and the core groove is configured to accommodate the bonding structure therein.

25 Claims, 10 Drawing Sheets

DISPLAY APPARATUS INCLUDING CORE PLATE INCLUDING CORE GROOVE AND CORE LEAD PORTION

CROSS-REFERENCE TO RELATED APPLICATION

This application claims priority, under 35 U.S.C. 119, to Korean Patent Application No. 10-2021-0176307 filed on Dec. 10, 2021 in the Republic of Korea, the entire contents of which being herein expressly incorporated by reference into the present application.

BACKGROUND

Technical Field

The present disclosure relates to a display apparatus, and more particularly, to a display apparatus mounted in a vehicle.

Description of Related Art

As the world enters an information era, a display apparatus that visually expresses an electrical information signal has developed rapidly. In response thereto, various display apparatuses having excellent performance, thinness, light weight, and low power consumption have been developed.

Such display apparatuses can include a liquid crystal display apparatus (LCD), an organic light-emitting display apparatus (OLED), a quantum dot (QD) display apparatus, etc.

Among those, a self-light-emitting display apparatus such as the organic light-emitting display apparatus is being considered as a competitive application in order to achieve compactness of the apparatus and vivid color display without requiring a separate light source.

Recently, the organic light-emitting display apparatus has been used to display information in vehicles. In this regard, the organic light-emitting display apparatus can be used as an instrument panel in front of a driver.

Furthermore, the organic light-emitting display apparatus can be mounted on a center fascia and used as a center information display (CID), and can be mounted on a dashboard in front of a passenger in the vehicle and used as an ambient information display (AID).

The organic light-emitting display apparatus that can be utilized as such is provided with an element that emits light in each sub-pixel, and the light-emitting element has two electrodes facing each other and a light-emitting layer that is disposed between the two electrodes and emits light when transported electrons and holes are recombined with each other. The organic light-emitting element is a self-light-emitting element using a thin light-emitting layer between the electrodes, which has an advantage of being able to be thinned.

Further, because of being implemented without a separate light source, the organic light-emitting element is easy to be implemented as a flexible, bendable, and foldable display apparatus, so that the organic light-emitting element can be designed in various forms.

In the center information display or the ambient information display, several information images can be displayed simultaneously in divided display areas. For example, not only an information image used for driving such as a navigation image, but also an image for the passenger such as a moving image can be displayed together. In addition, in recent years, a trend is to attach a member with a viewing-angle adjusting function to a display panel such that the driver who is driving does not view the image intended for the passenger, which is unnecessary to the driver, or the passenger does not view the image intended for the driving. Such technology can be applied to the vehicle as well as indoor/outdoor information display apparatuses with a large screen.

Such display apparatus applied to the vehicle can conduct a more stringent durability test in preparation for various accidents that can occur during high-speed traveling. For example, it is possible to conduct an impact amount test assuming a situation in which the passenger or the driver in the vehicle collides with the protruding display apparatus due to the vehicle accident. In particular, a head impact test (HIT) can be performed assuming a situation in which a head of the driver collides with a portion of the display apparatus. The impact amount test can mean the HIT. In this regard, when a deceleration of a colliding portion (head form, HF) of impact amount test equipment is high, it can be considered that an impact amount of the head of the driver can be great, and the driver can be fatally injured.

In the impact amount test, the deceleration is an opposite of an acceleration, and preferably means an amount of decrease in speed for each time. A unit of the impact amount test is $m/s^2$. When the deceleration during the collision is large, kinetic energy equal to a reduced acceleration can be transmitted to the head of the driver, which can cause injuries some being fatal. Thus, it can be considered as a test passing criterion that the deceleration does not exceed a certain amount.

Further, when the deceleration of the colliding portion of the impact amount test equipment is high, since an amount of impact acting on the display apparatus is great, a cover glass and the like of the display apparatus can be broken. When the cover glass is broken, a secondary accident can occur resulted therefrom. In particular, it is desirable to be more careful as the broken cover glass can be scattered towards the driver or the passenger.

Various methods to absorb the impact of the display apparatus are being studied as a way to reduce the deceleration during the impact amount test of the display apparatus. For example, there can be a method in which bonding between the cover glass and a core plate is broken by the impact.

However, in a situation in which there is no impact on such a bonding structure, the bonding between the cover glass and the core plate of the display apparatus needs to be well maintained. Only when an impact equal to or greater than a certain amount is applied to the cover glass, the cover glass on one side should be able to be deviated from the core plate.

SUMMARY OF THE DISCLOSURE

The present disclosure is to solve or address the above-mentioned problems and other limitations associated with the related art, and is directed to a structure in which, when performing an impact amount test that expects a collision of a passenger to a display apparatus that can occur on the display apparatus for the vehicle due to a vehicle accident, a level of a deceleration in the display apparatus becomes to be equal to or lower than a certain level.

For such reduction of the deceleration of the display apparatus, the present disclosure is directed to a structure in which, when a cover glass and a core plate constituting the display apparatus are subjected to an impact, bonding between the cover glass and the core plate is well broken, and thus, the cover glass is well separated from the core plate to prevent the cover glass from breaking and scattering.

On the other hand, the present disclosure is for a structure in which, when the impact is not applied to the display apparatus, the cover glass is well fixed to the core plate and is not separated therefrom even by vibrations occurred in the vehicle or manipulation of an occupant.

Purposes of the present disclosure are not limited to the above-mentioned purpose. Other purposes and advantages of the present disclosure that are not mentioned can be understood based on following descriptions, and can be more clearly understood based on embodiments of the present disclosure. Further, it will be easily understood that the purposes and advantages of the present disclosure can be realized using means shown in the claims and combinations thereof.

A display apparatus according to an embodiment of the present disclosure can include a display panel, a cover glass disposed on a top face of the display panel, a core plate disposed on a bottom face of the display panel and supporting the display panel, and a bonding structure disposed between the cover glass and the core plate, and the core plate can include a core groove defined therein capable of accommodating the bonding structure therein.

A display apparatus according to an embodiment of the present disclosure can include a display panel, a cover glass disposed on a top face of the display panel, a core plate disposed on a bottom face of the display panel and supporting the display panel, and a bonding structure disposed between the cover glass and the core plate, and the core plate can include a core groove defined therein and a core lead portion protruding from an inner wall of the core groove.

Other specific details of the embodiment are included in the detailed description and the drawings.

The display apparatus according to an embodiment of the present disclosure can present a new method for coupling the cover glass and the core plate to each other in order to pass a safety test of the display apparatus used in the vehicle.

Specifically, when conducting the impact amount test assuming a situation in which a head of the occupant collides with an infotainment system applied to a dashboard or a center fascia of the vehicle, as the deceleration is reduced, an amount of impact applied to the head of the occupant can be reduced according to an embodiment of the present disclosure.

During the impact amount test, the cover glass can be easily separated from the core plate according to an embodiment of the present disclosure, thereby preventing the cover glass from breaking and scattering.

Further, according to an embodiment of the present disclosure, the display apparatus, which is the infotainment system, can remain firmly attached against the vibrations that can occur during driving of the vehicle and the manipulation of the occupant, which are not the impact amount test.

Effects of the present disclosure are not limited to the above-mentioned effects, and other effects as not mentioned will be clearly understood by those skilled in the art from following descriptions.

The purposes, solutions, and effects of the disclosure as described above does not specify essential features of claims. Thus, the scope of claims is not limited by the purposes, solutions, and effects of the disclosure as described above.

BRIEF DESCRIPTION OF DRAWINGS

The present disclosure will become more fully understood from the detailed description given hereinbelow and the accompanying drawings which are given by way of illustration only, and thus are not limitative of the present disclosure.

DETAILED DESCRIPTIONS OF THE EMBODIMENTS

Figure 1:
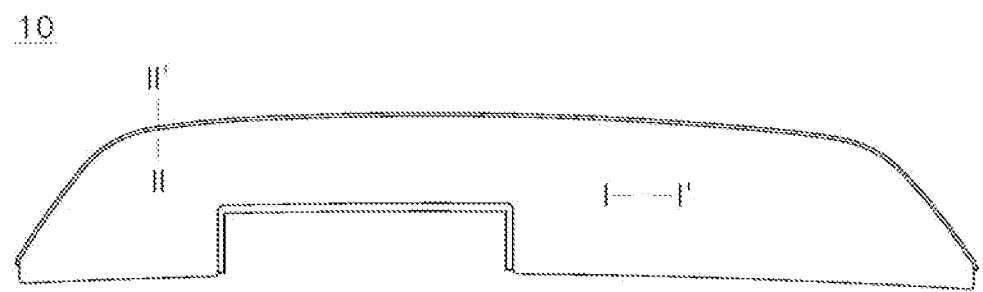
FIG. 1 is a plan view showing a front face of a display apparatus according to an embodiment of the present disclosure.

Advantages and features of the present disclosure, and how to achieve them will become apparent with reference to the embodiments described below in detail in conjunction with the accompanying drawings. However, the present disclosure is not limited to the embodiments as disclosed below, but will be implemented in a variety of different forms. Only these embodiments make the present disclosure complete, and are constructed to fully inform those having common knowledge in the technical field to which the present disclosure belongs of a scope of the disclosure. The scope of the present disclosure is only defined by the scope of the claims.

A shape, a size, a ratio, an angle, a number, etc. disclosed in the drawings for illustrating embodiments of the present disclosure are exemplary, and the present disclosure is not limited thereto. The same reference numerals refer to the same elements herein. Further, in describing the present disclosure, when it is determined that a detailed description of a related known element can unnecessarily obscure gist of the present disclosure, the detailed description thereof may be omitted or may be provided briefly. As used herein, the singular forms "a" and "an" are intended to include the plural forms as well, unless the context clearly indicates otherwise. It will be further understood that the terms "comprises", "comprising", "includes", and "including"

when used in this specification, specify the presence of the stated features, integers, operations, elements, and/or components, but do not preclude the presence or addition of one or more other features, integers, operations, elements, components, and/or portions thereof.

In interpreting a numerical value, the value is interpreted as including an error range unless there is no separate explicit description thereof.

It will be understood that when an element or layer is referred to as being "connected to", or "coupled to" another element or layer, it can be directly on, connected to, or coupled to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present. In addition, it will also be understood that when a first element or layer is referred to as being present "on" or "beneath" a second element or layer, the first element can be disposed directly on or beneath the second element or can be disposed indirectly on or beneath the second element with a third element or layer being disposed between the first and second elements or layers.

Further, as used herein, when a layer, film, region, plate, or the like is disposed "on" or "on a top" of another layer, film, region, plate, or the like, the former can directly contact the latter or still another layer, film, region, plate, or the like can be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former can directly contact the latter or still another layer, film, region, plate, or the like can be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event can occur therebetween unless "directly after", "directly subsequent" or "directly before" is indicated.

It will be understood that, although the terms "first", "second", "third", and so on can be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure can be partially or entirely combined with each other, and can be technically associated with each other or operate with each other. The embodiments can be implemented independently of each other and can be implemented together in an association relationship.

Spatially relative terms, such as "beneath," "below," "lower," "under," "above," "upper," and the like, can be used herein for ease of explanation to describe one element or feature's relationship to another element or feature as illustrated in the figures. It will be understood that the spatially relative terms are intended to encompass different orientations of the apparatus in use or in operation, in addition to the orientation depicted in the figures. For example, when the apparatus in the drawings can be turned over, elements described as "below" or "beneath" or "under" other elements or features would then be oriented "above" the other elements or features. Thus, the example terms "below" and "under" can encompass both an orientation of above and below. The apparatus can be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the present disclosure, a "display apparatus" can include display apparatus in a narrow sense, such as a liquid crystal module (LCM), an organic light-emitting diode (OLED) module, and a quantum dot (QD) module, including a display panel and a driver for driving the display panel. Moreover, the "display apparatus" can also include a set electronic apparatus or a set apparatus such as a laptop computer, a television, and a computer monitor, an equipment display including an automotive display or displays of other types of a vehicle, a mobile electronic apparatus such as a smartphone or an electronic pad, and the like, which are complete products (or final products) including an LCM, an OLED module, a QD module, and the like.

Therefore, the display apparatus in the present disclosure may not only include the display apparatus itself in the narrow sense such as the LCM, the OLED module, the QD module, and the like, but also include the set apparatus, which is an applied product or an end-user apparatus, including the LCM, the OLED module, the QD module, and the like.

Moreover, in some cases, the LCM, the OLED module, and the QD module composed of the display panel, the driver, and the like can be expressed as the "display apparatus" in the narrow sense, and the electronic apparatus as the complete product including the LCM, the OLED module, and the QD module can be expressed as the "set apparatus". For example, the display apparatus in the narrow sense can include a liquid crystal display (LCD) panel, organic light-emitting diode (OLED) display panel, or quantum dot display panel, and a source PCB that is a controller for driving the display panel, and the set apparatus can be a concept that further includes a set PCB, which is a set controller that is electrically connected to the source PCB and controls the entire set apparatus.

The display panel used in the present embodiment can be any type of display panel such as a liquid crystal display panel, an organic light-emitting diode (OLED) display panel, a quantum dot (QD) display panel, an electroluminescent display panel, and the like, and may not be limited to a specific display panel capable of bezel bending with a flexible substrate for the organic light-emitting diode (OLED) display panel of the present embodiment and a lower backplate support structure. Moreover, the display panel used in the display apparatus according to an embodiment of the present disclosure is not limited in a shape or a size.

More specifically, when the display panel is the organic light-emitting diode (OLED) display panel, the display panel can include a plurality of gate lines and data lines, and pixels formed in intersection areas of the gate lines and the data lines. Moreover, the display panel can include an array including a thin-film transistor, which is an element for selectively applying a voltage to each pixel, an organic light-emitting element (OLED) layer on the array, and an encapsulation substrate or an encapsulation layer disposed on the array to cover the organic light-emitting element layer. The encapsulation layer can protect a thin-film transistor, the organic light-emitting element layer, and the like from an external impact, and can prevent penetration of moisture or oxygen into the organic light-emitting element layer. Moreover, a layer formed on the array can include an inorganic light emitting layer, for example, a nano-sized material layer or a quantum dot. Further, all the components of each display apparatus according to all embodiments of the present disclosure are operatively coupled and configured.

FIG. 1 is a plan view showing a front face of a display apparatus 10 according to an embodiment of the present disclosure.

Referring to FIG. 1, the display apparatus 10 is for a vehicle and represents the display apparatus 10 in which a driver's seat instrument panel area and a center fascia for displaying various information such as a navigation are integrally formed, but is not necessarily limited thereto. For example, an embodiment of the present disclosure can be applied even in a case of a display apparatus, a TV, or the like that is disposed indoors and outdoors to provide commercial advertisements or various information. Further, a shape of the display apparatus 10 can correspond to various shapes based on a purpose and a use of a product for the vehicle or widely used indoors and outdoors.

Figure 2:
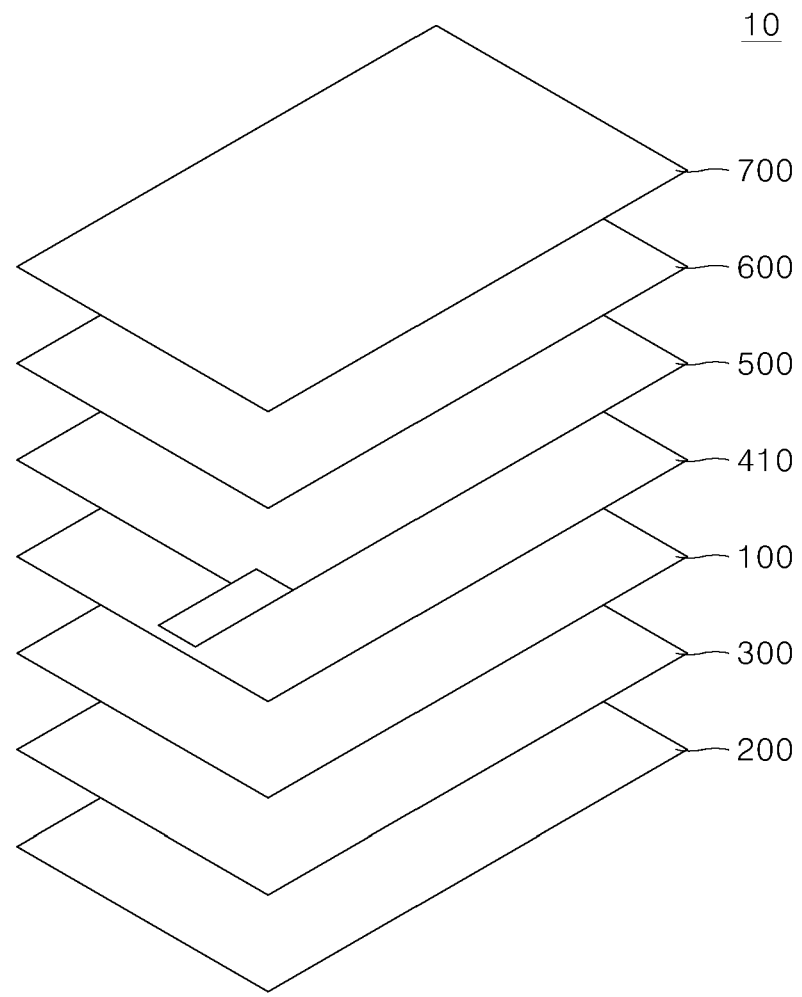
FIG. 2 is an exploded perspective view showing a structure of the display apparatus in FIG. 1.

FIG. 2 is an exploded perspective view showing components of the display apparatus 10 according to an embodiment of the present disclosure. When listed based on a back face of the display apparatus 10, layers of a heat dissipation plate 200, a core plate 300, a display panel 100, a polarizing film 400, a viewing-angle adjustment member 500, a touch panel 600, a cover glass 700, and the like can be stacked in order to manufacture the display apparatus 10. However, the stack order is not necessarily limited thereto. For example, the polarizing film 400 can be disposed on top of the viewing-angle adjustment member 500 and the touch panel 600 to improve shielding of external light.

Referring to FIG. 2, the heat dissipation plate 200 can be disposed to dissipate and emit heat generated in the display panel 100. For example, the heat dissipation plate 200 can be made of a metal material, and can have a high thermal conductivity while being harder than the display panel 100 because of a nature of the metal. When a screen of the display apparatus 10 is operated for a long time or when a temperature of the display panel 100 rises resulted from a rise of an external temperature, a problem can occur in normal operation of the display screen. The heat dissipation is an important factor to prevent such operation failure of the display screen, and a plate made of aluminum or copper is able to be used.

The core plate 300 having a function of supporting the display panel 100 can be disposed on top of the heat dissipation plate 200. The core plate 300 can serve to prevent deformation or breakage of the display panel 100 during a process that the display panel 100 is manufactured on a flexible substrate. The core plate 300 can be made of a material such as polyethylene terephthalate (PET) that is light and transparent.

The display panel 100 can be disposed on top of the core plate 300, and the polarizing film 400 can be disposed on top of the display panel 100. The display panel 100 will be described in detail in FIG. 3. The polarizing film 400 has a function of controlling incidence and reflection of the external light in the display panel 100 such that the display screen is visible even outdoors.

By disposing the viewing-angle adjustment member 500 on top of the polarizing film 400, a function of passing screen light generated from the display panel 100 at a specific viewing-angle and blocking the screen light at a specific viewing-angle can be performed. The function of the viewing-angle adjustment member 500 will be described in detail in FIG. 4.

The touch panel 600 and the cover glass 700 can be disposed on top of the viewing-angle adjustment member 500. The touch panel 600 can be built into the display panel 100, but in the present embodiment, a configuration in which the separate touch panel 600 is disposed will be taken as an example. The cover glass 700 can function to protect the display panel 100, the viewing-angle adjustment member 500, the touch panel 600, and the like from the top.

Figure 3:
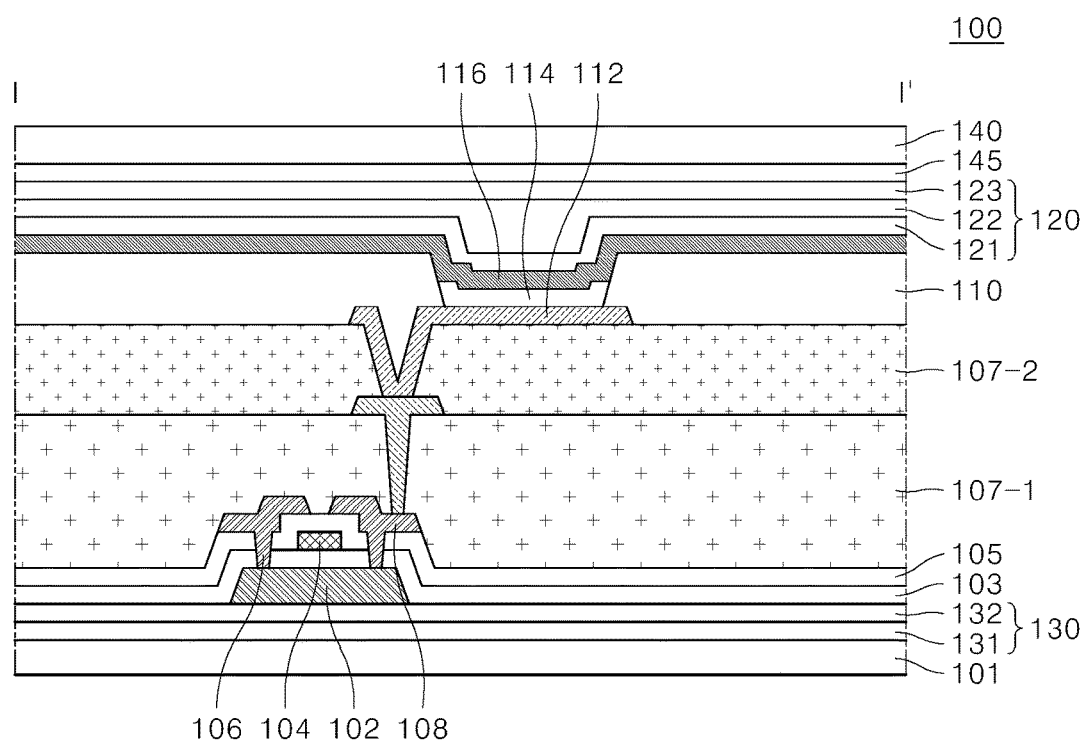
FIG. 3 is a cross-sectional view showing a cross-section of a display panel taken along a line I-I' of the display apparatus in FIG. 1.

FIG. 3 is a cross-sectional view showing an I-I' cross-section, which is a display area. The display panel 100 in FIG. 3 has an exemplary structure composed of two planarization layers.

Referring to FIG. 3, in the display panel 100, a semiconductor layer 102, gate insulating film 103, a gate electrode 104, an interlayer insulating film 105, source and drain electrodes 106 and 108 constituting a thin-film transistor, and an anode electrode 112, an organic light-emitting layer 114, a cathode electrode 116 constituting an organic light-emitting element are positioned on a substrate 101.

The substrate 101 can be a glass or plastic substrate. In the case of the plastic substrate, a polyimide-based or polycarbonate-based material can be used for flexibility. In particular, because the polyimide is able to be applied to a high-temperature process and is a material that can be coated, the polyimide is often used as the plastic substrate.

The buffer layer 130 is a functional layer for protecting an electrode/wire from impurities such as an alkali ion or the like leaking from the substrate 101 or underlying layers. The buffer layer can be made of a silicon oxide (SiOx), a silicon nitride (SiNx), or can be composed of multiple layers thereof. The buffer layer 130 can include a multi buffer 131 and/or an active buffer 132. The multi buffer 131 can be formed by alternately stacking the silicon nitride (SiNx) and the silicon oxide (SiOx), and can delay diffusion of moisture and/or oxygen penetrated into the substrate 101. The active buffer 132 protects the semiconductor layer 102 of the transistor, and performs a function of blocking various types of defects introduced from the substrate 101. The active buffer 132 can be made of amorphous silicon (a-Si) or the like.

The thin-film transistor can have a form in which the semiconductor layer 102, a gate insulating film 103, the gate electrode 104, an interlayer insulating film 105, and the source and drain electrodes 106 and 108 are sequentially disposed. The semiconductor layer 102 is located on the buffer layer 130. The semiconductor layer 102 can be made of polysilicon (p-Si). In this case, a predetermined area can be doped with the impurities. Further, the semiconductor layer 102 can be made of the amorphous silicon (a-Si) and can be made of various organic semiconductor materials, such as pentacene. Further, the semiconductor layer 102 can be made of an oxide. The gate insulating film 103 can be formed of an insulating inorganic material such as the silicon oxide (SiOx) or the silicon nitride (SiNx), or can be made of an insulating organic material or the like. The gate electrode 104 can be made of various conductive materials, for example, magnesium (Mg), aluminum (Al), nickel (Ni), chromium (Cr), molybdenum (Mo), tungsten (W), gold (Au), or an alloy thereof.

The interlayer insulating film 105 can be made of an insulating inorganic material such as the silicon oxide (SiOx) or the silicon nitride (SiNx) or can be made of the insulating organic material or the like. Contact holes from which source and drain areas are exposed can be defined by selectively removing the interlayer insulating film 105 and the gate insulating film 103.

The source and drain electrodes 106 and 108 are formed in a shape of a single layer or multiple layers made of a material for the electrode on the interlayer insulating film 105. When necessary, a passivation layer made of the inorganic insulating material can cover the source and drain electrodes 106 and 108.

A first planarization layer 107-1 can be positioned on the thin-film transistor. The first planarization layer 107-1 protects the thin-film transistor and the like and planarize a portion on top of the thin-film transistor. The first planarization layer 107-1 can be formed in various shapes, and can be made of at least one of an acrylic-based resin, an epoxy resin, a phenolic resin, a polyamide-based resin, a polyimide-based resin, an unsaturated polyester-based resin, a polyphenylene-based resin, a polyphenylene sulfide-based resin, but may not be limited thereto.

Various metal layers serving as the wire/electrode can be disposed on top of the first planarization layer 107-1.

The second planarization layer 107-2 is positioned on top of the first planarization layer 107-1. The fact that there are two planarization layers is due to an increase in the number of various signal wirings as the display apparatus 100 evolves to have a high resolution. Therefore, it is difficult to arrange all the wirings in one layer while ensuring a minimum spacing, so that an additional layer is formed. Such additional layer (the second planarization layer) frees up the wiring arrangement, making it easier to design the wire/electrode arrangement. Further, when a dielectric material is used for the planarization layers 107-1 and 107-2, the planarization layers 107-1 and 107-2 can be used to form a capacitance between metal layers.

The organic light-emitting element can have a form in which the anode electrode 112, the organic light-emitting layer 114, and the cathode electrode 116 are sequentially disposed. For example, the organic light-emitting element can be composed of the anode electrode 112 formed on top of the planarization layer, the organic light-emitting layer 114 positioned on top of the anode electrode 112, and the cathode electrode 116 positioned on top of the organic light-emitting layer 114.

The anode electrode 112 can be electrically connected to a drain electrode 108 of a driving thin-film transistor via a connection electrode. When the organic light-emitting display apparatus 100 operates in a top emission scheme, such anode electrode 112 can be made of an opaque conductive material having high reflectivity. For example, the anode electrode 112 can be made of silver (Ag), aluminum (Al), gold (Au), molybdenum (Mo), tungsten (W), chromium (Cr), or an alloy thereof. The connection electrode can be made of the same material as the source and drain electrodes 106 and 108.

A bank 110 is formed in a remaining area except for a light-emitting area. Accordingly, the bank 110 has a bank hole exposing the anode electrode 112 corresponding to the light-emitting area. The bank 110 can be made of the inorganic insulating material, for example, a silicon nitride film (SiNx), a silicon oxide film (SiOx), or the organic insulating material such as BCB, the acrylic-based resin, or the imide-based resin.

The organic light-emitting layer 114 is placed on top of the anode electrode 112 exposed by the bank 110. The organic light-emitting layer 114 can include a light-emitting layer, an electron injection layer, an electron transport layer, a hole transport layer, a hole injection layer, and the like.

The cathode electrode 116 is positioned on top of the organic light-emitting layer 114. When the display apparatus 100 operates in the top emission scheme, the cathode electrode 116 is made of a transparent conductive material such as an indium tin oxide (ITO), an indium zinc oxide (IZO), or the like to emit light generated from the organic light-emitting layer 114 from a top of the cathode electrode 116.

An encapsulation layer 120 is positioned on top of the cathode electrode 116. The encapsulation layer 120 prevents penetration of oxygen and moisture from the outside in order to prevent oxidation of the light-emitting material and the electrode material. When the organic light-emitting element is exposed to the moisture or the oxygen, a pixel shrinkage phenomenon in which the light-emitting area is reduced can appear, or a dark spot can occur in the light-emitting area. The encapsulation layer can be formed as an inorganic film made of glass, metal, an aluminum oxide (AlOx) or a silicon (Si)-based material, or can have a structure in which an organic film and an inorganic film are alternately stacked. The inorganic film serves to block the penetration of the moisture or the oxygen, and the organic film serves to planarize a surface of the inorganic film. The reason for forming the encapsulation layer as multiple thin-film layers is to make a flow passage of the moisture or the oxygen longer and more complicated than a single layer to make it difficult for the moisture/oxygen to penetrate the organic light-emitting element.

Specifically, the encapsulation layer 120 can include a first inorganic insulating film 121, an organic insulating film 122, and a second inorganic insulating film 123, and the first inorganic insulating film 121, the organic insulating film 122, and the second inorganic insulating film 123 can be sequentially disposed.

A barrier film 140 is positioned on top of the encapsulation layer 120 to encapsulate the entire substrate 101 including the organic light-emitting element. The barrier film 140 can be a phase retardation film or an optical isotropic film. When the barrier film has an optical isotropic property, light incident on the barrier film is transmitted as it is without a phase delay. Further, an organic film or an inorganic film can be further positioned on a top or bottom face of the barrier film. The organic or inorganic film formed on the top or bottom face of the barrier film serves to block the penetration of the external moisture or oxygen.

An adhesive layer 145 can be positioned between the barrier film 140 and the encapsulation layer 120. The adhesive layer 145 adheres the encapsulation layer 120 and the barrier film 140 to each other. The adhesive layer 145 can be a thermally curable or naturally curable adhesive. For example, the adhesive layer 145 can be made of a material such as a barrier pressure sensitive adhesive (B-PSA). On top of the barrier film 140, a touch panel (film), a polarizing film, a top face cover, and the like can be further positioned.

Figure 4:
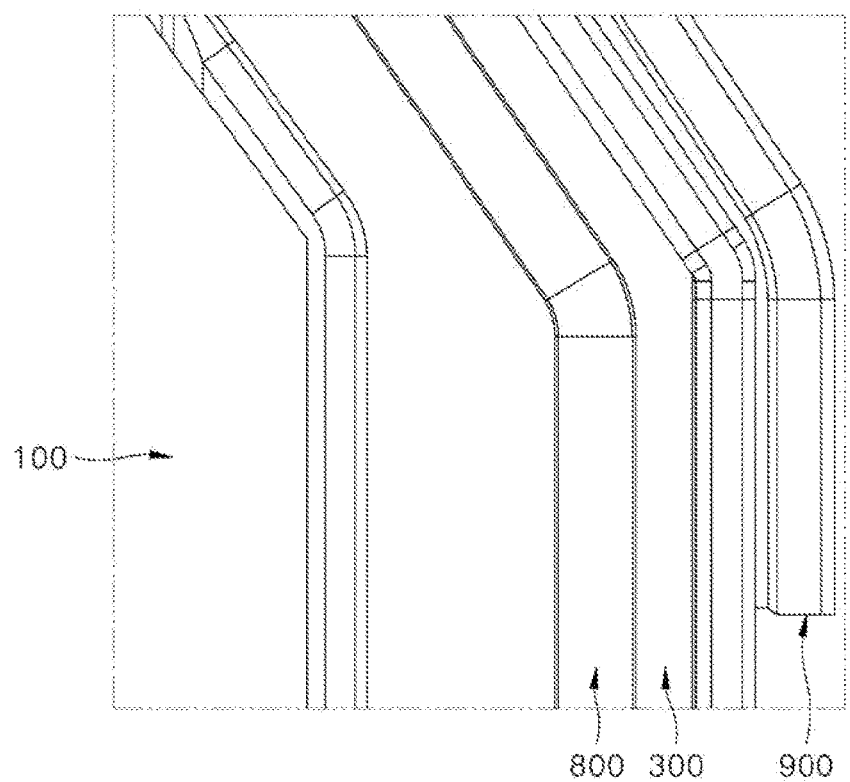
FIG. 4 is an exploded perspective view showing a stack structure of an outer edge of the display apparatus in FIG. 1.

FIG. 4 shows a state in which the cover glass 700 is not attached to the display apparatus 10 having the appearance in FIG. 1 or the stack structure in FIG. 2, and is able to show a form in which a bonding structure 800 is coupled to the core plate 300. The display panel 100 can be attached to the inside at a predetermined distance from an outer edge of the core plate 300. As a groove is defined at a center of the core plate 300, the display panel 100 can be inserted. Via the groove, it is possible to protect the display panel 100 from an impact that can be applied from the outside.

The bonding structure 800 can be spaced apart from the display panel 100 by a predetermined distance and disposed adjacent to the outer edge of the core plate 300. For example, the bonding structure 800 can be disposed between the display panel 100 and the outer edge of the core plate 300.

Referring to FIG. 4, the bonding structure 800 can be completely coupled to the core plate 300 and a top face of the bonding structure 800 can be exposed, so that a bonding adhesive 810 (see FIG. 5) for attachment to the cover glass 700 can be disposed on the top face of the bonding structure 800.

A decor cover 900 can be disposed at the outermost edge of the core plate 300, so that the core plate 300 may not be exposed to the outside and there can be an aesthetic effect.

Figure 5:
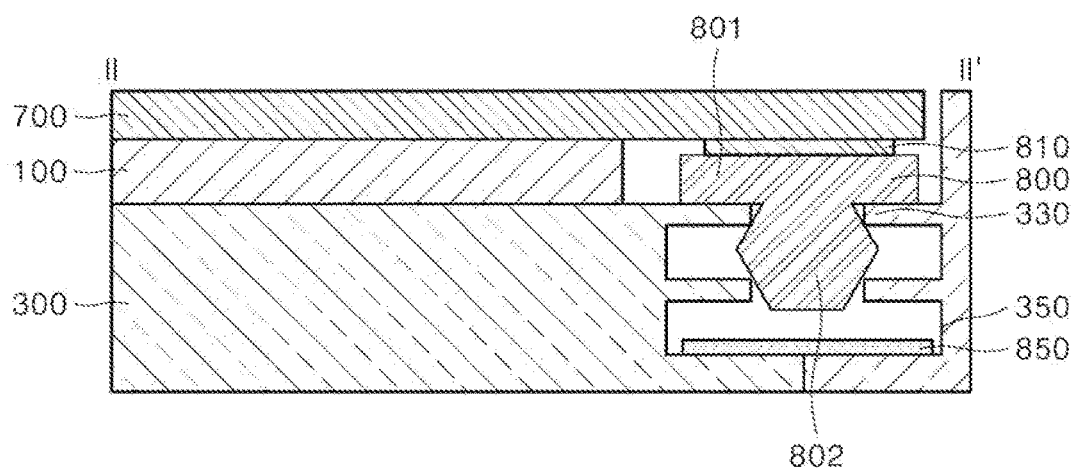
FIG. 5 is a cross-sectional view showing a cross-section of a bonding structure for connecting a cover glass and a core plate to each other, taken along a line II-II' of the display apparatus in FIG. 1.

FIG. 5 is a cross-sectional view showing a cut line II-II' in FIG. 1.

Referring to FIG. 5, the display panel 100 can be disposed on top of one face of the core plate 300, and the bonding structure 800 can be disposed between the display panel 100 and the outer edge of the core plate 300.

The cover glass 700 can be disposed on top of the display panel 100 and the bonding structure 800, and the bonding adhesive 810 can be disposed between the bonding structure 800 and the cover glass 700. It is possible to maintain the structure in which the cover glass 700 and the bonding structure 800 are coupled to each other by the bonding adhesive 810. The core plate 300 can include a core groove 350 and a core lead portion 330, and the bonding structure 800 can include a bonding upper portion 801 and a bonding lower portion 802 protruding from the bonding upper portion 801.

The core groove 350 and the core lead portion 330 can be disposed for coupling with the bonding structure 800, and can be disposed to overlap the bonding structure 800. The core groove 350 is an area in which a portion of the core plate 300 is removed to define a space where the bonding lower portion 802 of the bonding structure 800 can be inserted. The core groove 350 can be disposed in an area corresponding to the bonding lower portion 802 of the bonding structure 800, and can be disposed at an outer edge of the display apparatus or at at least a portion or an entirety of an outer edge of the display panel 100.

The core lead portion 330 can protrude from an inner wall of the core groove 350. The core lead portion 330 can be disposed so that at least a portion of the core plate 300 protrudes in the core groove 350.

Referring to FIG. 5, it can be seen that the four portions extending from the core plate 300 to the core groove 350 are in contact with or adjacent to a portion of the bonding lower portion 802. It can be seen that an outer edge of the bonding lower portion 802 is able to be bound because of the extended shape of the core lead portion 330, and the outer edge of the bonding lower portion 802 also has a polygonal, for example, hexagonal cross-section that can correspond to the same.

The core groove 350 can have a greater width than the bonding upper portion 801, and a depth of the core groove 350 can be greater than a height of the bonding structure 800. This is to enable the bonding structure 800 coupled to the cover glass 700 to be completely buried in the core groove 350 when an external impact occurs on the corresponding portion of the cover glass 700. A more detailed description will be made later.

A damper 850 (see FIG. 6) can be disposed on a bottom face of the core groove 350. The damper 850 can be made of a material having elasticity, thereby absorbing the impact. For example, the material can be a material containing a urethane vinyl or a gel component.

The core plate 300 requires a material property of preventing damage to surrounding parts by deforming itself when the impact occurs while having processability and durability of a certain level. To this end, the core plate 300 can use a magnesium alloy, and can use an AZ31, which is a magnesium alloy plate, in particular.

Because the bonding structure 800 should have the durability of the certain level while having the excellent processability, an aluminum alloy can be used.

The bonding adhesive 810 disposed on top of the bonding structure 800 can use a UV-curable resin for smooth adhesion with the cover glass 700.

Figure 6:
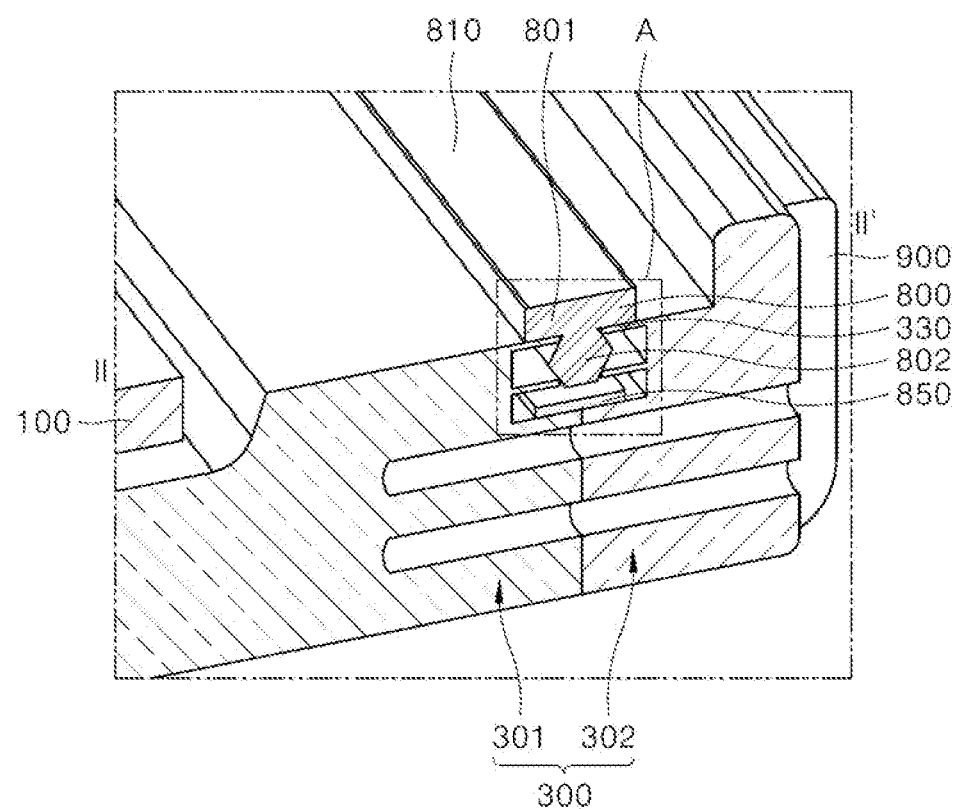
FIG. 6 is a perspective view to help understand a cross-section in FIG. 5.

FIG. 6 is a perspective view to help understand a structure of a corner shown in FIG. 5. In a structure without the cover glass 700, the core plate 300, the display panel 100, the bonding structure 800, and the decor cover 900 are shown.

Referring to FIG. 6, the core plate 300 can be divided into a first plate 301 and a second plate 302. For the coupling of the core plate 300 and the bonding structure 800, the core plate 300 can be manufactured separately as the first plate 301 and the second plate 302.

The bonding structure 800 can be inserted into a space between the first plate 301 and the second plate 302, and the first plate 301 and the second plate 302 are bonded and fastened to each other such that the bonding lower portion 802 of the bonding structure 800 is positioned on the core lead portion 330 of the first plate 301 and the core lead portion 330 of the second plate 302, thereby enabling the core lead portion 330 to be coupled without breakage. By attaching the decor cover 900 on an exterior of the second plate 302, it is possible to prevent the core plate 300 from being exposed to the outside.

Figure 7:
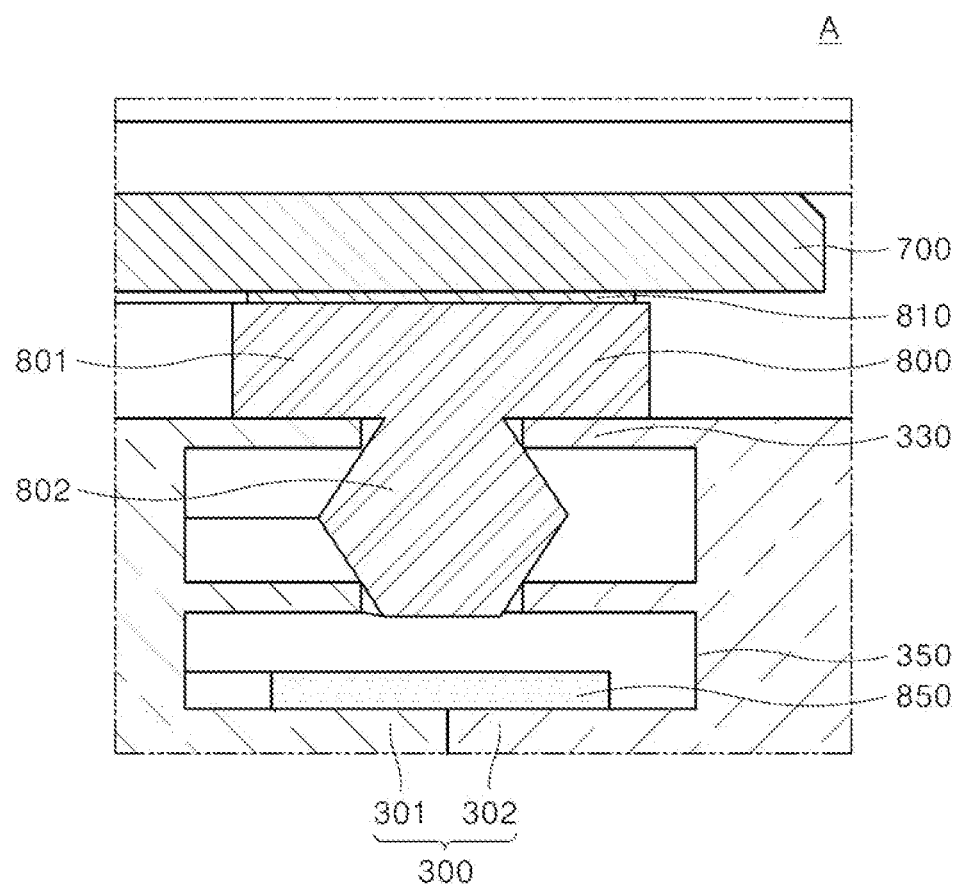
FIG. 7 is an enlarged cross-sectional view of an area A in FIG. 6.

FIG. 7 is an enlarged cross-sectional view of an area A, which is a portion where the bonding structure 800 is attached in FIG. 6.

Referring to FIG. 7, there are the bonding upper portion 801 and the bonding lower portion 802 of the bonding structure 800, and there are areas where the first plate 301 and the second plate 302 are removed to define the core groove 350, respectively. From the core groove 350, portions of the first plate 301 and portions of the second plate 302 can extend to face each other to form a plurality of core lead portions 330.

The damper 850 can be installed on the bottom face of the core groove 350, and a width of the damper 850 can be greater than a width of the bonding lower portion 802.

Referring to FIG. 7, the bonding lower portion 802 can have a polygonal shape, for example, a hexagonal cross-section, and specifically, the bonding lower portion 802 can have a shape in which an area adjacent to the bonding upper portion 801 and an area adjacent to the damper 850 have a narrow width. At least two pairs of the core lead portions 330 respectively extending from the first plate 301 and the second plate 302 can be disposed at the two points with the narrow width of the bonding lower portion 802 to support the bonding upper portion 801 while holding the bonding lower portion 802 at the same time.

The bonding adhesive 810 can be disposed on top of the bonding upper portion 801, and the cover glass 700 can be disposed on top of the bonding adhesive 810.

Referring to FIG. 7, it can be seen that the bonding upper portion 801 has a smaller width than the core groove 350. When the impact is applied to an area adjacent to the bonding structure 800 during an impact amount test, the bonding upper portion 801 and the bonding lower portion 802 of the bonding structure 800 directly apply the impact to the core lead portion 330. As a result, the core lead portion 330 can be bent or broken.

When the core lead portion 330 is bent or broken, the bonding structure 800 enters the core groove 350, and the bonding lower portion 802 can collide with the damper 850 to absorb the impact. For such impact absorbing process, the bonding upper portion 801 must have the narrower width than the core groove 350.

Figure 8:
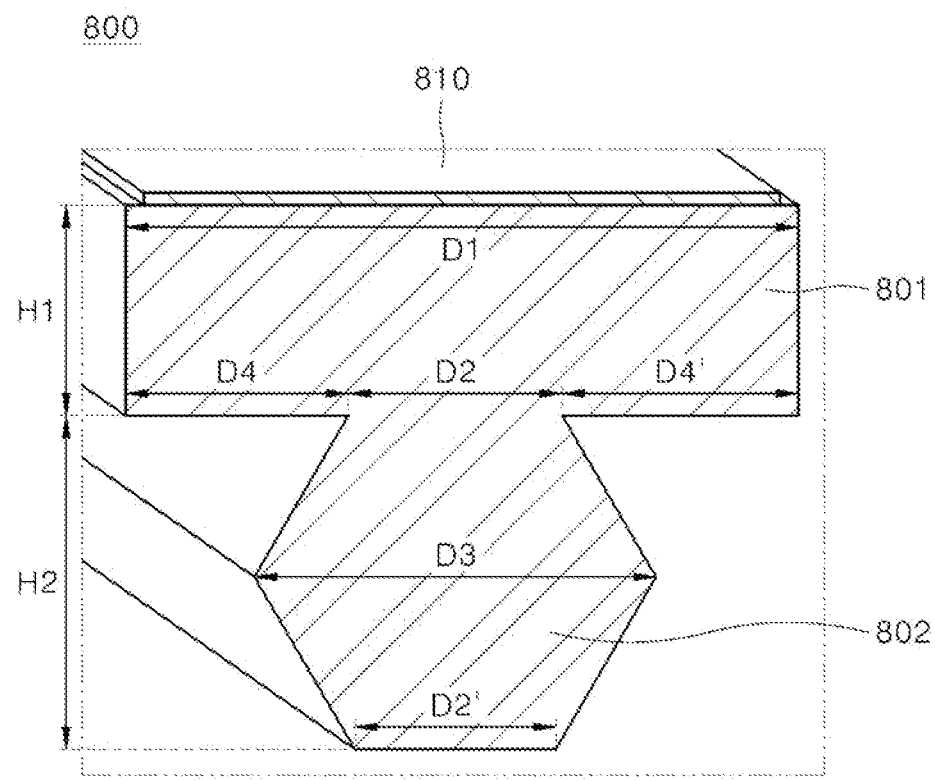
FIG. 8 is a perspective cross-sectional view showing a bonding structure used in an embodiment of the present disclosure.

FIG. 8 is an enlarged cross-sectional view of the bonding structure 800 according to an embodiment of the present disclosure.

Referring to FIG. 8, a specific design of the bonding structure 800 is shown. A height of the bonding upper portion 801 of the bonding structure 800 can be defined as a first height H1, a height of the bonding lower portion 802 can be defined as a second height H2, and a width of the bonding upper portion 801 can be defined as a first width D1.

A width of an area in contact with the bonding upper portion 801 on a top face of the bonding lower portion 802 can be defined as a second width D2, a width of an area opposite to the bonding upper portion 801 can be defined as a second' width D2', and a width of a central wide area of the bonding lower portion 802 can be defined as a third width D3.

In the bonding upper portion 801, widths of left and right areas on a bottom face thereof excluding the area in contact with the top face of the bonding lower portion 802 can be defined as fourth and fourth' widths D4 and D4'.

For the function of the bonding structure 800, the first width D1 can be greater than the third width D3 and the third width D3 can be greater than the second width D2. For example, the third width D3 can have a length of about twice that of the second width D2. Specifically, the first width D1 can be about 8 mm, the second width D2 can be about 3 mm, and the third width D3 can be about 6 mm.

The first height H1 of the bonding structure 800 can be smaller than the second height H2. For example, the second height H2 can be more than twice the first height H1. Specifically, the first height H1 can be about 4 mm and the second height H2 can be about 10 mm. In particular, the second height H2 can be smaller than a height of the core groove 350 to be described later to maximize the impact absorption effect.

Figure 9A:
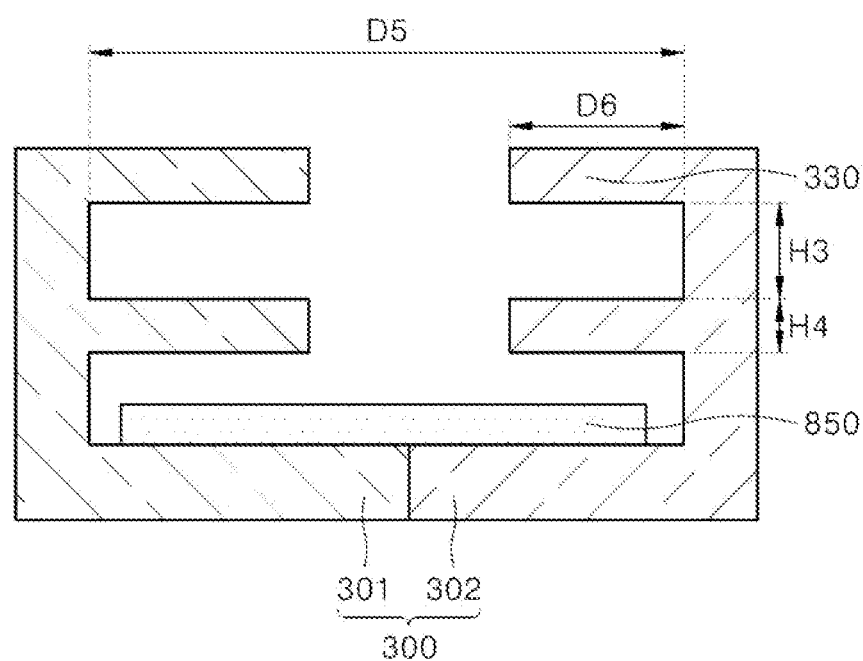
FIGS. 9A and 9B show a cross-section and a top face of the core plate corresponding to the bonding structure according to an embodiment of the present disclosure.
Figure 9B:
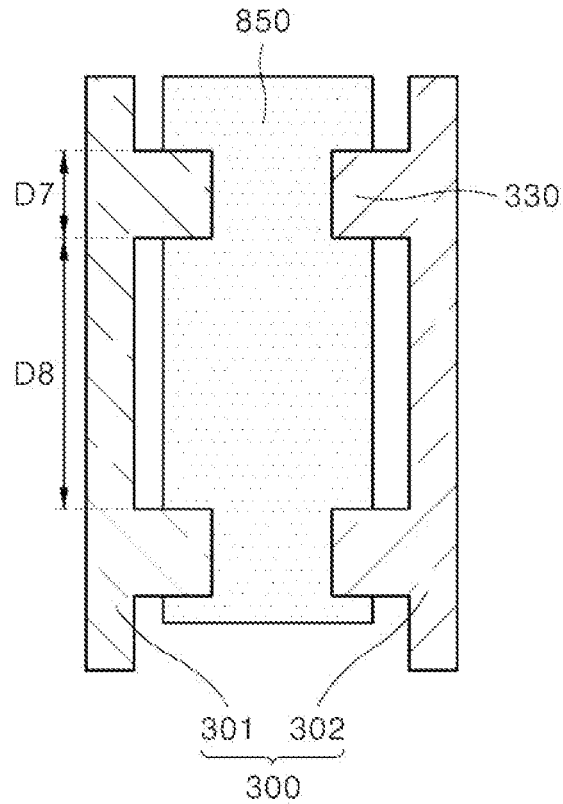

FIGS. 9A and 9B show a cross-section and a top face of the core plate 300 corresponding to the bonding structure 800.

Referring to FIG. 9A, a form in which the bonding structure 800 is omitted from the cross-section of an area of the core plate 300 to which the bonding structure 800 correspond is shown. First, there is a fifth width D5 corresponding to the core groove 350 of the area of the core plate 300. An inner height of the core groove 350 can be defined as a third height H3. A length of the core lead portion 330 extending from each of the first plate 301 and the second plate 302 in the core groove 350 can be defined as a sixth width D6, and a thickness thereof can be defined as a fourth height H4.

Referring to FIG. 9A, the fifth width D5 corresponding to the core groove 350 can be greater than the first width D1 of the bonding structure 800 in FIG. 8. The third height H3 can be equal to or slightly larger than a sum of the first height H1 and the second height H2 of the bonding structure 800.

For example, the fifth width D5 can be about 10 mm and the third height H3 can be about 14 mm.

The sixth width D6 of the core lead portion 330 can be about 3 mm and the fourth height H4 can be about 1 mm.

FIG. 9B is a plan view of the core plate 300 corresponding to the bonding structure 800 viewed from the top.

Referring to FIG. 9B, the core lead portion 330 extending from the first plate 301 can have a seventh width D7 and can be spaced by a distance of an eighth width D8, greater than D7, apart from an adjacent core lead portion 330. The core lead portion 330 can include a plurality of core lead portions 330 spaced apart from each other in the core groove 350. The arrangement of the core lead portions 330 can be selective depending on a target deceleration of the impact amount test.

The seventh width D7 of the core lead portion 330 can be about 6 mm, and the eighth width D8, which is the spacing between the adjacent core lead portions 330, can be about 20 mm. Although the core lead portion 330 can be disposed on a front face along the core groove 350, in this case, a degree of impact resistance of the core lead portion 330 can be increased, so that the deceleration can be greatly increased. This means that a great amount of impact is applied to a head of an occupant or a driver during the collision, so that disposing of the core lead portion 330 in front of the core groove 350 is not preferred.

A shape in which the core lead portions 330 are disposed at regular spacings as shown in FIG. 9B is preferred. Referring to FIG. 9B, although the shape in which the core lead portion 330 of the first plate 301 and the core lead portion 330 of the second plate 302 face each other is shown, the present disclosure is not limited thereto and the core lead portion 330 of the first plate 301 and the core lead portion 330 of the second plate 302 can be alternately disposed.

Figure 10A:
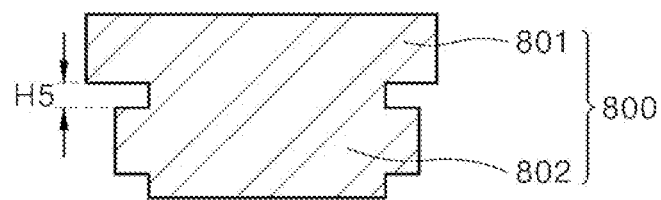
FIGS. 10A and 10B are cross-sectional views showing a cross-section of a bonding structure according to another embodiment of the present disclosure.
Figure 10B:
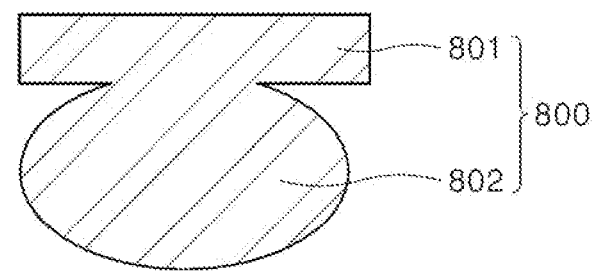

FIGS. 10A and 10B are cross-sectional views showing another embodiment of the bonding structure 800.

Referring to FIG. 10A, it can be seen that, unlike the bonding lower portion 802 in FIG. 8, FIG. 10A, which is another embodiment of the bonding lower portion 802 of the bonding structure 800, has an angular shape without an inclined face. Unlike the bonding structure 800 in FIG. 8, the bonding structure 800 in FIG. 10A has an angular shape at the place where the bonding upper portion 801 and the bonding lower portion 802 are in contact, thereby minimizing an interference with the core lead portion 330 extending from the core groove 350. A portion of the bonding lower portion 802 in FIG. 8 in contact with the core lead portion 330 can be an inclined face because of the polygonal, for example, the hexagonal shape of the bonding lower portion 802, which can cause the core lead portion 330 to deform.

Because an area of the bonding lower portion 802 in FIG. 10A corresponding to the core lead portion 330 has a rectangular shape, the interference can be minimized. A protrusion protruding outwardly from the bonding lower portion 802 in FIG. 10A and spaced apart from the bonding upper portion 801 can have a separation distance of the fifth height H5 from the bonding upper portion 801. The fifth height H5 is greater than the fourth height H4 of the core lead portion 330. Thus, when the first plate 301, the second plate 302, and the bonding structure 800 are coupled to each other, it is possible to prevent the deformation of the bonding structure 800 resulted from the interference between the bonding lower portion 802 and the core lead portion 330.

Referring to FIG. 10B, which is another embodiment of the bonding structure 800, the bonding lower portion 802 can be manufactured in a cylindrical or curved shape.

When the bonding lower portion 802 is manufactured in the cylindrical or curved shape, the core lead portion 330 is deformed more softly than in other embodiments during the impact amount test, so that the phenomenon in which the core lead portion 330 is broken can be reduced.

When the core lead portion 330 is broken at once, the core plate 300 can be deformed without absorbing the whole amount of impact. In this case, since the core lead portion 330 does not fully absorb the amount of impact, the deceleration of the display apparatus can be significantly reduced. Accordingly, the display apparatus including the cover glass 700 can move a considerable distance. Therefore, when the deceleration is too small, the moving distance of the cover glass 700 can be increased, and the cover glass 700 can be greatly deformed, and thus can be broken. When the core lead portion 330 is gently deformed to minimize the breakage to prevent the same, although the deceleration can be increased to a certain extent, it is possible to prevent the cover glass 700 from breaking as the core lead portion 330 absorbs a relatively large amount of impact.

Figure 11A:
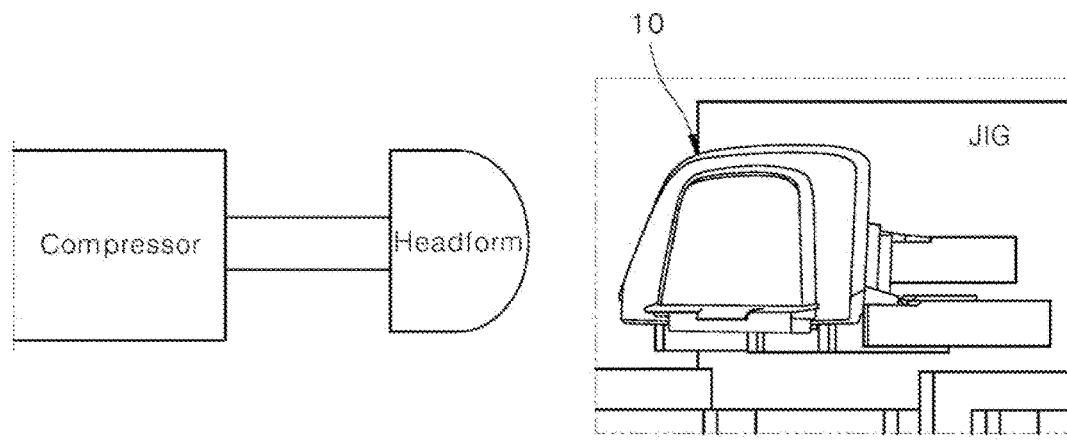
FIGS. 11A and 11B show an example of an impact amount test described in the present disclosure.
Figure 11B:
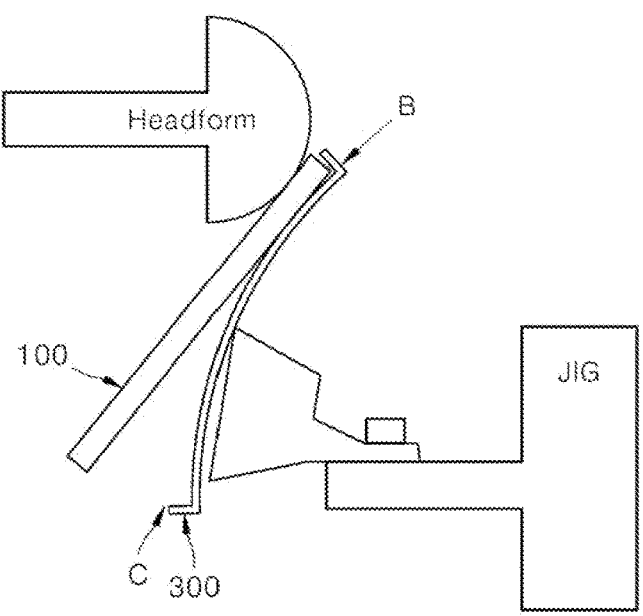

FIGS. 11A and 11B show a progress of an impact amount test.

Referring to FIG. 11A, with the display apparatus 10 attached to a jig, a head form having a size similar to a head size of the occupant goes straight through a bar connected to a compressor. The head form can be set to mainly collide with a corner of the display apparatus 10 to identify the impact amount or the deceleration via a sensor mounted on the head form.

Such evaluation, referred to as the impact amount test or a head impact test, is mainly to check safety of the display apparatus for the vehicle, and is carried out to minimize a human body impact amount by assessing the case in which the head of the occupant collides with the display apparatus 10 for the vehicle when a collision accident of the vehicle occurs.

Passing criteria of such impact amount test can be largely managed as two. The first is head injury criteria (HIC), and is that, after the head form hits the display apparatus 10, the deceleration for 3 ms duration will not exceed the maximum 80 G (HIC3<80 G). The deceleration is an opposite concept of the acceleration, and is an amount by which speed is reduced per hour. A unit of the deceleration is m/s², and G of 80 G presented as a standard is 9.81 m/s², which is the gravitational acceleration.

<Head Injury Criteria Formula>

$$HIC = \max_{t_1, t_2}\left\{\left[\frac{1}{t_2 - t_1}\int_{t_1}^{t_2} \alpha(t)dt\right]^{2.5}(t_2 - t_1)\right\}$$

The head injury criteria are numerical values of when a result of integrating a synthesis deceleration a of the head form within an integration section from t1 to t2 as shown in the above formula is the maximum. Because a maximum value of the deceleration becomes a maximum value of the impact amount, a structure capable of absorbing and cancelling the impact is needed to reduce the deceleration.

The second is that a sharp portion resulted from a breakage of an impact portion will not occur, which is to prevent a secondary injury resulted from fragments after the collision. When the core plate 300 supporting the display apparatus 10 does not absorb sufficient stress when the impact is applied to the display apparatus 10, the breakage can occur from the cover glass 700 on the uppermost face of the display apparatus 10.

As the cover glass 700 is made of the glass or the transparent plastic material, the cover glass 700 can inflict the secondary injury on the occupant when being scattered due to the breakage. In order to prevent this, a design that does not generate the sharp portion even when the impact portion is broken is required.

FIG. 11B is a view showing how the display panel 100 and the core plate 300 supporting the display panel 100 are deformed when the head form collides with the display apparatus 10 in an embodiment of the present disclosure.

When the head form collides with an area B of the display apparatus 10, the display panel 100 and the core plate 300 supporting the display panel 100 are pushed back. In this regard, a phenomenon in which an area C of the display panel 100, which is a side opposite to a side of the collision of the head form, is separated from the core plate 300 can occur as the core plate 300 is bent. The impact amount can be absorbed and cancelled as a portion of the core plate 300 corresponding to the impact portion is bent, and the breakage of the cover glass 700 of the display apparatus 10 can be prevented as the display panel 100 is separated from the core plate 300 in a spacing portion opposite to the impact portion.

Figure 12A:
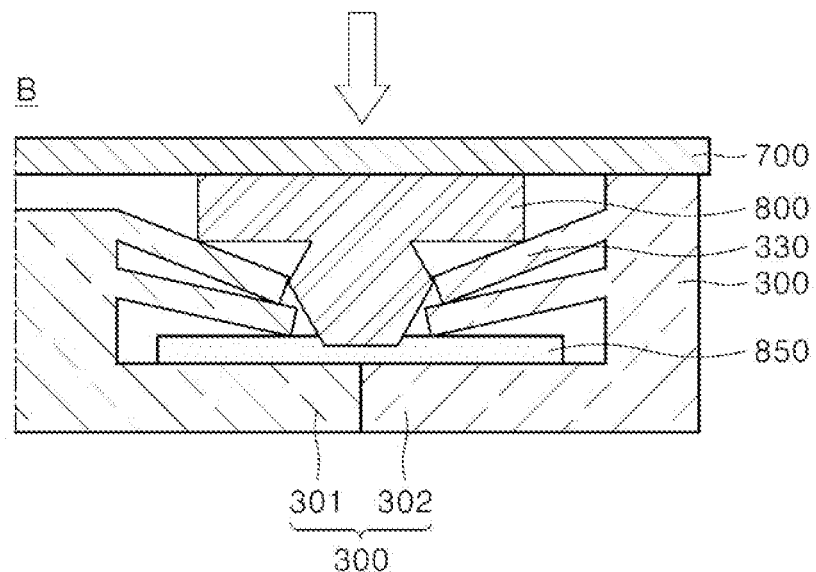
FIGS. 12A and 12B are cross-sectional views showing cross-sectional structures of an impact portion B and a spacing portion C in FIG. 11B.
Figure 12B:
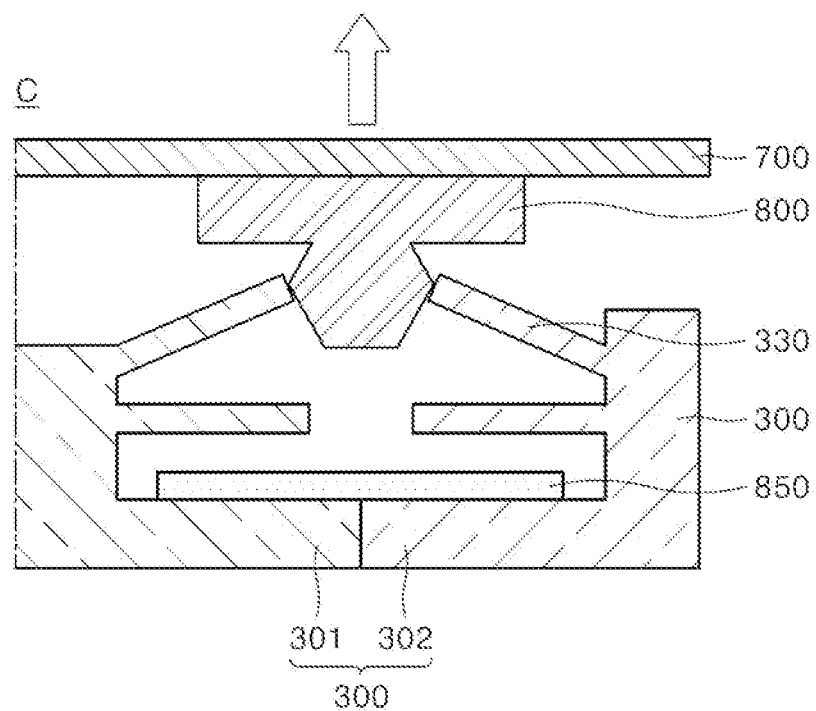

FIGS. 12A and 12B are enlarged cross-sectional views showing deformation of the core plate 300 and the bonding structure 800 in an area B, which is an impact portion, and an area C, which is a spacing portion, during an impact amount test.

Referring to FIG. 12A, when the impact is applied to the area B of the display apparatus 10 by the impact amount Test, the bonding structure 800 adhered to the cover glass 700 is pushed into the core groove 350, and thus, the core lead portion 330 is pushed into the core groove 350 together. When the bonding structure 800 completely enters the core groove 350 by the impact, the bonding structure 800 stops as the impact is finally absorbed by the damper 850 disposed on the bottom face of the core groove 350. In this regard, the core lead portion 330 that was supporting the bonding lower portion 802 of the bonding structure 800 is completely broken and is pushed toward the damper 850.

Referring to FIG. 12B, when the impact is applied to the area B of display apparatus 10 by the impact amount test, the bonding structure 800 adhered to the cover glass 700 is separated from and pushed out of the core groove 350 in the opposite area C, and thus, the core lead portion 330 is separated from and pushed out of the core groove 350 together. As the core plate 300 is bent due to the impact of the area B in FIG. 12A, the display panel 100 and the cover glass 700 in the area C are separated from the core plate 300 due to a repulsive force, so that the stress applied to the cover glass 700 can be cancelled.

Figure 13:
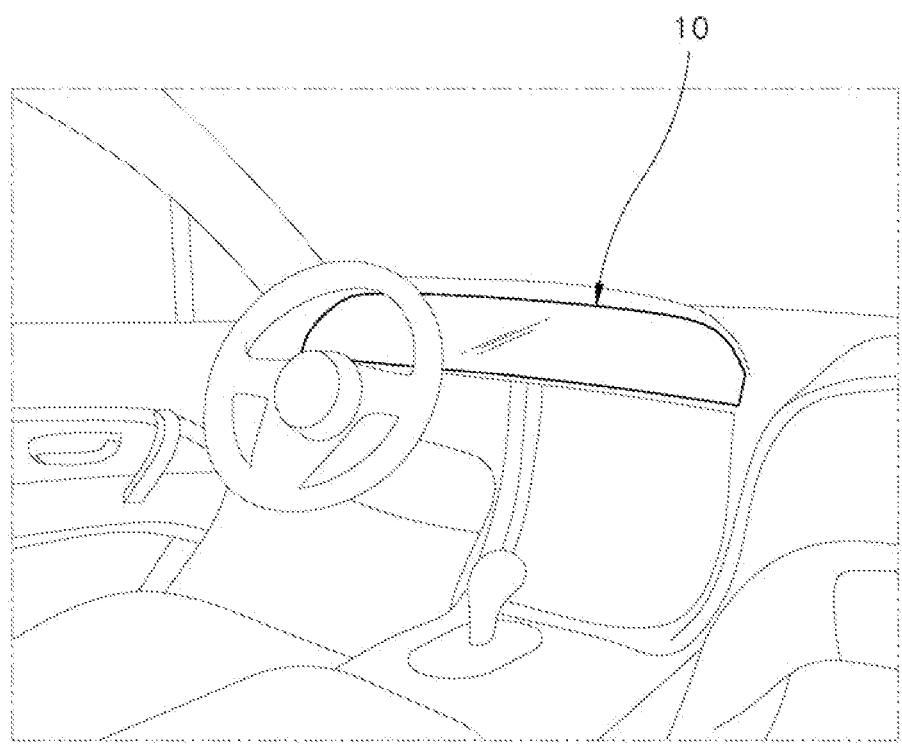
FIG. 13 is a view showing an interior of a vehicle to which a display apparatus according to an embodiment of the present disclosure is applied.

FIG. 13 is a view showing a form in which a display apparatus according to an embodiment of the present disclosure is applied in a vehicle.

Referring to FIG. 13, by inserting or accommodating the display apparatus 10 to which a viewing-angle control member 500 is applied into a dashboard or a center fascia of the vehicle, the driver and the passenger can utilize an infotainment system together or individually.

A display apparatus according to an embodiment of the present disclosure can be described as follows.

A first aspect of the present disclosure provides a display apparatus including a display panel; a cover glass disposed on a top face of the display panel; a core plate disposed on a bottom face of the display panel and supporting the display panel; and a bonding structure disposed between the cover glass and the core plate, wherein the core plate further includes a core groove defined therein capable of accommodating the bonding structure therein.

In one implementation of the first aspect, the core plate further includes a core lead portion protruding from an inner wall of the core groove.

In one implementation of the first aspect, the bonding structure includes a bonding upper portion and a bonding lower portion protruding from the bonding upper portion, and the core lead portion supports the bonding lower portion.

In one implementation of the first aspect, the core lead portion includes at least two pairs of core lead portions.

In one implementation of the first aspect, a cross-section of the bonding lower portion has a polygonal shape.

In one implementation of the first aspect, the display apparatus further includes a bonding adhesive disposed on top of the bonding structure, and the bonding structure and the cover glass are attached to each other via the bonding adhesive.

In one implementation of the first aspect, when an external force is applied to the cover glass and the bonding structure, the core lead portion is bent.

In one implementation of the first aspect, the core lead portion includes a plurality of core lead portions spaced apart from each other in the core groove.

In one implementation of the first aspect, the bonding structure has a first width, the core groove has a second width, and the first width is smaller than the second width.

In one implementation of the first aspect, the bonding structure has a first height, the core groove has a second height, and the first height is equal to or smaller than the second height.

A second aspect of the present disclosure provides a display apparatus including a display panel; a cover glass disposed on a top face of the display panel; a core plate disposed on a bottom face of the display panel and supporting the display panel; and a bonding structure disposed between the cover glass and the core plate, wherein the core plate further includes a core groove defined therein and a core lead portion protruding from an inner wall of the core groove.

In one implementation of the second aspect, the bonding structure includes a bonding upper portion and a bonding lower portion protruding from the bonding upper portion, and the core lead portion supports the bonding lower portion.

In one implementation of the second aspect, the core lead portion includes at least two pairs of core lead portions.

In one implementation of the second aspect, a cross-section of the bonding lower portion has a hexagonal shape.

In one implementation of the second aspect, the display apparatus further includes a bonding adhesive disposed on top of the bonding structure, and the bonding structure and the cover glass are attached to each other via the bonding adhesive.

In one implementation of the second aspect, when an external force is applied to the cover glass and the bonding structure, the core lead portion is bent.

In one implementation of the second aspect, the core lead portion includes a plurality of core lead portions spaced apart from each other in the core groove.

In one implementation of the second aspect, the bonding structure has a first width, the core groove has a second width, and the first width is smaller than the second width.

In one implementation of the second aspect, the bonding structure has a first height, the core groove has a second height, and the first height is equal to or smaller than the second height.

Features, structures, effects, and the like described in the examples of the present application described above are included in at least one example of the present application, and are not necessarily limited to only one example. Furthermore, features, structures, effects, and the like illustrated in at least one example of the present application can be combined or modified with respect to other examples by those of ordinary skill in the art to which the present application belongs. Accordingly, the contents related to such combinations and modifications should be interpreted as being included in the scope of the present application.

The present disclosure as described above is not limited to the above-described embodiments and the accompanying drawings. It will be apparent to those of ordinary skill in the technical field to which the present disclosure belongs that various substitutions, modifications and changes can be made within the scope not departing from the technical ideas of the present disclosure. Therefore, the scope of the present disclosure is indicated by the following claims, and all changes or modifications derived from the meaning and scope of the claims and their equivalent concepts should be construed as being included in the scope of the present disclosure.

What is claimed is:

1. A display apparatus comprising:
a display panel;
a cover glass disposed on a top face of the display panel;
a core plate disposed on a bottom face of the display panel and supporting the display panel; and
a bonding structure disposed between the cover glass and the core plate,
wherein the core plate includes a core groove defined therein, and a core lead portion,
wherein the core groove is configured to accommodate the bonding structure therein,
wherein the core lead portion protrudes from an inner wall of the core groove,
wherein the bonding structure includes a bonding upper portion and a bonding lower portion protruding from the bonding upper portion, and
wherein a protrusion protruding outwardly from the bonding lower portion and spaced apart from the bonding upper portion has a separation distance from the bonding upper portion which is greater than a height of the core lead portion.

2. The display apparatus of claim 1,
wherein the core lead portion of the core plate supports the bonding lower portion of the bonding structure.

3. The display apparatus of claim 2, wherein the core lead portion of the core plate includes at least two pairs of core lead portions.

4. The display apparatus of claim 2, wherein a cross-section of the bonding lower portion of the bonding structure has a polygonal shape.

5. The display apparatus of claim 2, wherein a width of the bonding upper portion is greater than a width of a central area of the bonding lower portion, and the width of the central area of the bonding lower portion is greater than a width of an area in contact with the bonding upper portion on a top face of the bonding lower portion.

6. The display apparatus of claim 2, wherein a height of the bonding upper portion is smaller than a height of the bonding lower portion.

7. The display apparatus of claim 6, wherein the height of the bonding lower portion is smaller than a height of the core groove.

8. The display apparatus of claim 2, further comprising a damper installed on a bottom face of the core groove, wherein a width of the damper is greater than a width of the bonding lower portion.

9. The display apparatus of claim 2, wherein a cross-section of the bonding lower portion has an angular shape without an inclined face.

10. The display apparatus of claim 1, further comprising a bonding adhesive disposed on top of the bonding structure, wherein the bonding structure and the cover glass are attached to each other via the bonding adhesive.

11. The display apparatus of claim 1, wherein, when an external force is applied to the cover glass and the bonding structure, the core lead portion of the core plate is bent.

12. The display apparatus of claim 1, wherein the core lead portion of the core plate includes a plurality of core lead portions spaced apart from each other in the core groove.

13. The display apparatus of claim 12, wherein the plurality of core lead portions are disposed at regular spacings.

14. The display apparatus of claim 12, wherein a spacing between adjacent core lead portions among the plurality of core lead portions is greater than a width of each of the plurality of core lead portions.

15. The display apparatus of claim 1, wherein the bonding structure has a first width, the core groove has a second width, and the first width is smaller than the second width.

16. The display apparatus of claim 1, wherein the bonding structure has a first height, the core groove has a second height, and the first height is equal to or smaller than the second height.

17. A display apparatus comprising:

a display panel;

a cover glass disposed on a top face of the display panel;

a core plate disposed on a bottom face of the display panel and supporting the display panel; and a bonding structure disposed between the cover glass and the core plate, wherein the core plate includes a core groove defined therein and a core lead portion protruding from an inner wall of the core groove, wherein the bonding structure includes a bonding upper portion and a bonding lower portion protruding from the bonding upper portion, and wherein a protrusion protruding outwardly from the bonding lower portion and spaced apart from the bonding upper portion has a separation distance from the bonding upper portion which is greater than a height of the core lead portion.

18. The display apparatus of claim 17, wherein the core lead portion of the core plate supports the bonding lower portion of the bonding structure.

19. The display apparatus of claim 18, wherein the core lead portion of the core plate includes at least two pairs of core lead portions.

20. The display apparatus of claim 18, wherein a cross-section of the bonding lower portion of the bonding structure has a hexagonal shape.

21. The display apparatus of claim 17, further comprising a bonding adhesive disposed on top of the bonding structure, wherein the bonding structure and the cover glass are attached to each other via the bonding adhesive.

22. The display apparatus of claim 17, wherein, when an external force is applied to the cover glass and the bonding structure, the core lead portion of the core plate is bent.

23. The display apparatus of claim 17, wherein the core lead portion of the core plate includes a plurality of core lead portions spaced apart from each other in the core groove.

24. The display apparatus of claim 17, wherein the bonding structure has a first width, the core groove has a second width, and the first width is smaller than the second width.

25. The display apparatus of claim 17, wherein the bonding structure has a first height, the core groove has a second height, and the first height is equal to or smaller than the second height.

* * * * *